(12) United States Patent
Matsuda et al.

(10) Patent No.: US 9,233,615 B2
(45) Date of Patent: Jan. 12, 2016

(54) VEHICLE-SIDE CONNECTOR HAVING A HOUSING WITH WIRE DRAW-OUT OPENINGS IN DIFFERENT DIRECTIONS

(71) Applicant: Sumitomo Wiring Systems, Ltd., Yokkaichi, Mie (JP)

(72) Inventors: Toshiyuki Matsuda, Yokkaichi (JP); Ryota Sakai, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 14/533,303

(22) Filed: Nov. 5, 2014

(65) Prior Publication Data

US 2015/0147918 A1 May 28, 2015

(30) Foreign Application Priority Data

Nov. 25, 2013 (JP) ................................. 2013-242674

(51) Int. Cl.
*H01R 24/66* (2011.01)
*B60L 11/18* (2006.01)
*H01R 13/58* (2006.01)
*H02J 7/00* (2006.01)
*H01R 13/506* (2006.01)

(52) U.S. Cl.
CPC ............. *B60L 11/18* (2013.01); *H01R 13/5841* (2013.01); *H01R 24/66* (2013.01); *H02J 7/00* (2013.01); *H01R 13/506* (2013.01); *H01R 2201/26* (2013.01)

(58) Field of Classification Search
CPC ......... H01R 13/56; H01R 24/66; H01R 13/04

USPC .......................................... 439/501–506, 694
See application file for complete search history.

(56) References Cited

U.S. PATENT DOCUMENTS

| | | | | |
|---|---|---|---|---|
| 1,984,181 A * | 12/1934 | Stanley | .................. | H01R 13/56 439/694 |
| 5,704,813 A * | 1/1998 | Weeks | ................. | H03K 17/945 439/540.1 |
| 5,830,006 A * | 11/1998 | Koumatsu | .......... | H01R 13/5829 439/449 |
| 6,287,153 B1 * | 9/2001 | Asaoka | ................ | H01R 13/454 439/694 |
| 2004/0077213 A1 * | 4/2004 | Sakiyama | .......... | H01R 13/5216 439/557 |
| 2011/0287667 A1 | 11/2011 | Ichio | | |

* cited by examiner

*Primary Examiner* — Chandrika Prasad
(74) *Attorney, Agent, or Firm* — Gerald E. Hespos; Michael J. Porco; Matthew T. Hespos

(57) ABSTRACT

A vehicle-side connector (C) to which a charging connector is to be connected includes a housing (20) capable of accommodating vehicle-side terminal fittings (11) fixed to ends of wires (10) drawn out from a battery in a vehicle. A connector fitting portion (25) is provided in a front part of the housing (20), and the charging connector can fit therein so that terminal connecting portions (13) of the vehicle-side terminal fittings (11) are electrically connectable to the charging connector. A terminal accommodating portion (30) is provided in a rear part of the housing (20) and is capable of accommodating parts of the vehicle-side terminal fittings (11) behind the terminal connecting portions (13), The terminal accommodating portion (30) is formed with a first draw-out opening (32) through which the wires (10) can be drawn backward and a second draw-out opening (33) through which the wires (10) can be drawn out laterally.

5 Claims, 18 Drawing Sheets

VEHICLE-SIDE CONNECTOR HAVING A HOUSING WITH WIRE DRAW-OUT OPENINGS IN DIFFERENT DIRECTIONS

BACKGROUND

1. Field of the Invention

The invention relates to a vehicle-side connector to which a charging connector is to be connected at the time of charging.

2. Description of the Related Art

US Patent Application Publication No. 2011/0287667 discloses a vehicle-side connector that includes a housing capable of accommodating a vehicle-side terminal fitting connected to an end part of a wire drawn out from a battery or the like in a vehicle. The vehicle-side terminal fitting accommodated in the housing is held retained by a retainer mounted in a rear side of the housing. The wire is drawn out to a side behind the vehicle-side connector through a cut hole formed on the retainer.

The layout of parts in an engine component differs depending on vehicle type, and hence a sufficient space may not be ensured immediately behind the vehicle-side connector. In such a case, it is desired to draw out the wire laterally from the vehicle-side connector and reduce a backward projecting distance from the vehicle-side connector as much as possible. However, the backward projecting distance of the vehicle-side connector cannot be reduced sufficiently. Thus, it has been necessary to prepare housings having different shapes for a case where the wire is drawn out backward from the vehicle-side connector and a case where the wire is drawn out laterally from the vehicle-side connector.

The invention was completed based on the above situation and aims to enable the use of a vehicle-side connector regardless of spatial restriction.

SUMMARY OF THE INVENTION

The invention relates to a vehicle-side connector to which a charging connector is to be connected at the time of charging and includes a housing that is capable of accommodating a vehicle-side terminal fitting fixed to an end part of a wire drawn out from a battery or the like in a vehicle. A connector fitting is provided in a front part of the housing, and the vehicle-side terminal fitting is arranged in the connector fitting. The charging connector is fit into the connector fitting and electrically connects to the vehicle-side terminal fitting. A terminal accommodating portion is provided in a rear part of the housing and can accommodate a part of the vehicle-side terminal fitting behind the terminal connecting portion. The terminal accommodating portion s formed with a first draw-out opening through which the wire is drawn backward or axially and a second draw-out opening through which the wire is drawn out laterally or radially.

According to such a configuration, the wire can be drawn out through the first draw-out opening when it is desired to draw out the wire backward from the vehicle-side connector and drawn out through the second draw-out opening when it is desired to draw out the wire downward from the vehicle-side connector due to spatial restriction or the like. By drawing out the wire downward through the second draw-out opening, a backward projecting distance can be reduced as compared with the case where the wire drawn out through the first draw-out opening is bent down. Thus, the housing can be used commonly regardless of spatial restriction.

Further, the vehicle-side terminal fitting may be a bent terminal fitting that is bent at an angle, preferably substantially at a right angle and partly laterally projects through the second draw-out opening. Accordingly, the backward projecting distance can be further reduced since a bending radius can be reduced as compared with the case where the wire is bent.

The terminal accommodating portion may have a tubular shape that is open backward.

An inner member may be fit into the terminal accommodating portion and may be formed with an insertion hole that enables the terminal connecting portion of the vehicle-side terminal fitting to be inserted into the connector fitting.

The inner member may include a thin inner member substantially in the form of a thin plate that can fit into a side of the terminal accommodating portion before the second draw-out opening.

According to such a configuration, the backward projecting distance can be reduced further since the wire or a straight part of the bent terminal fitting arranged in the insertion hole of the inner member can be shortened as compared with the case the inner member is in the form of a thick plate when the wire or the bent terminal fitting is bent behind the inner member and drawn out through the second draw-out opening.

DETAILED DESCRIPTION

Figure 1:
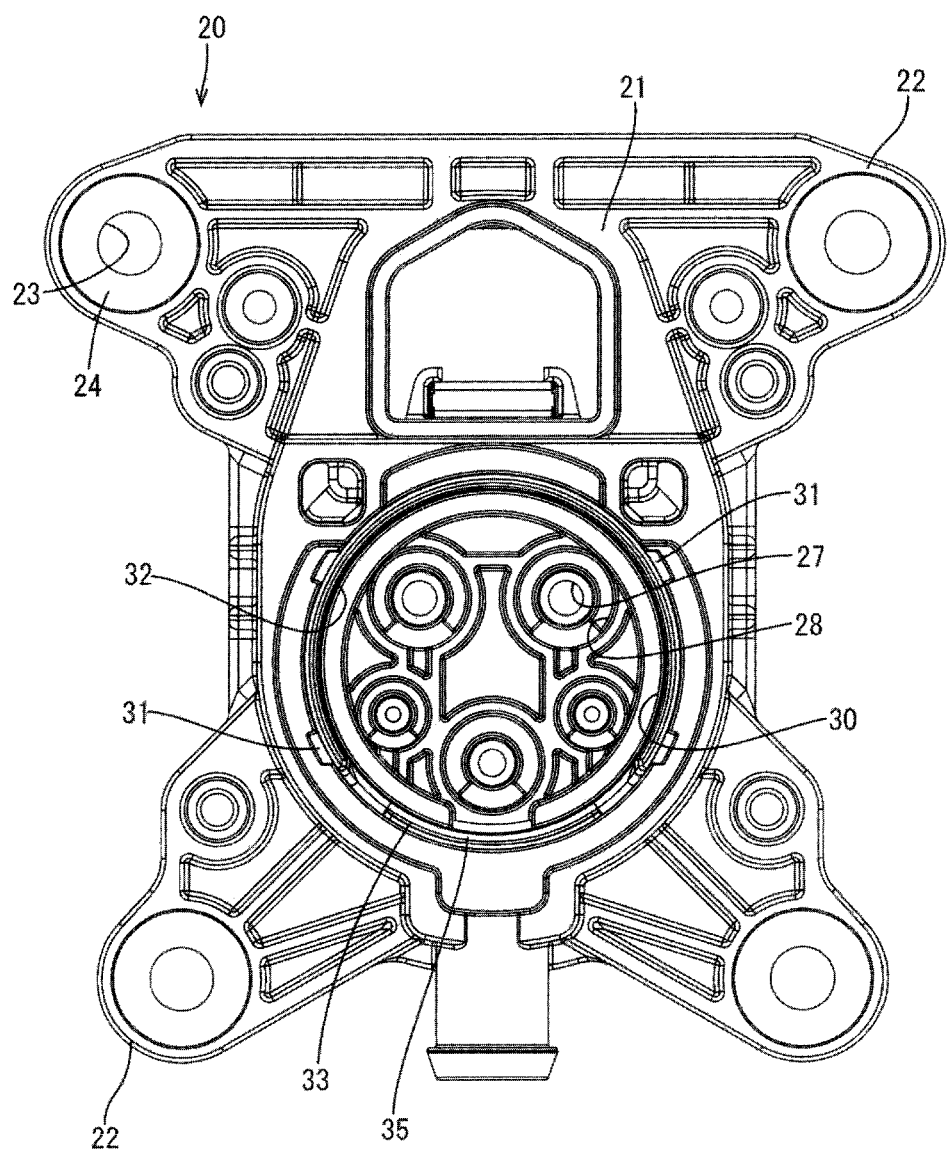
FIG. 1 is a rear view showing a housing in an embodiment.

A vehicle-side connector in accordance with an embodiment of the invention is described in detail with reference to FIGS. 1 to 18 and is identified generally by the letter C. The vehicle-side connector C is a connector to which a mating charging connector (not shown) is to be connected to charge a battery mounted in a plug-in hybrid vehicle or electric vehicle. In the following description, a side to be connected to the charging connector is referred to as a front side for each constituent member and upper and lower sides of FIG. 1 are referred to as upper and lower sides.

The vehicle-side connector C includes a housing 20 capable of accommodating vehicle-side terminal fittings 11 to be connected to end parts of wires 10 drawn out from the battery or the like in the vehicle and an unillustrated temperature sensor. Of the five vehicle-side terminal fittings 11, two are power terminals P and one is a ground terminal G. These three vehicle-side terminal fittings 11 are connected to ends of the wires 10 having a large diameter (hereinafter, referred to as thick wires 10A). Three thick wires 10A are bundled into one collective shield wire 12, such as a cabtyre cable, which is a flexible cable having an outer sheathing of heavy rubber or of synthetic rubber such as polychloroprene. The other two of the five vehicle-side terminal fittings 11 are signal terminals S, have a slightly smaller diameter than the other vehicle-side terminal fittings 11 and are connected to the end parts of the wires 10 having a small diameter (hereinafter, referred to as thin wires 10B).

Figure 2:
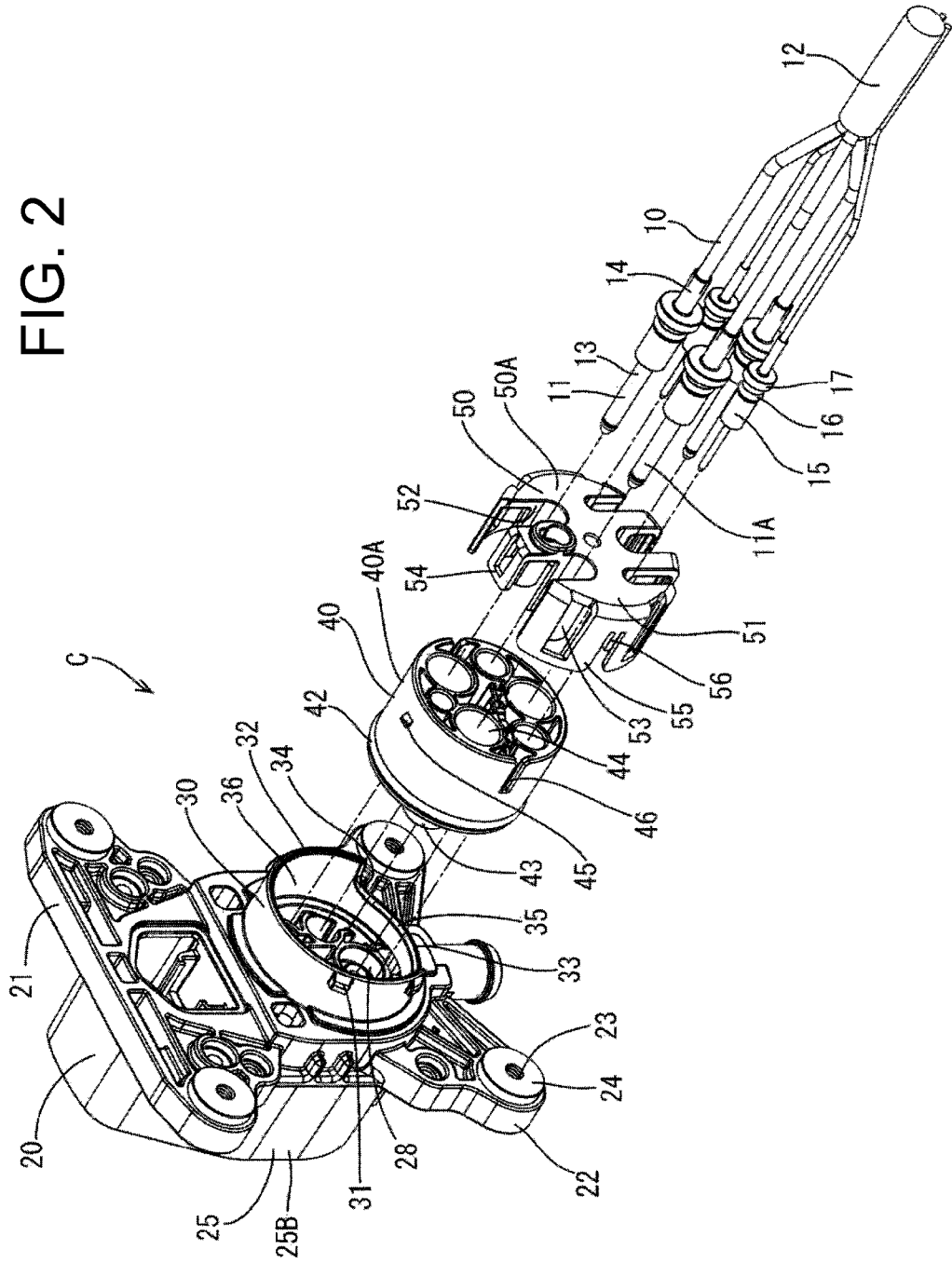
FIG. 2 is an exploded perspective view showing a vehicle-side connector when wires are drawn out backward.
Figure 10:
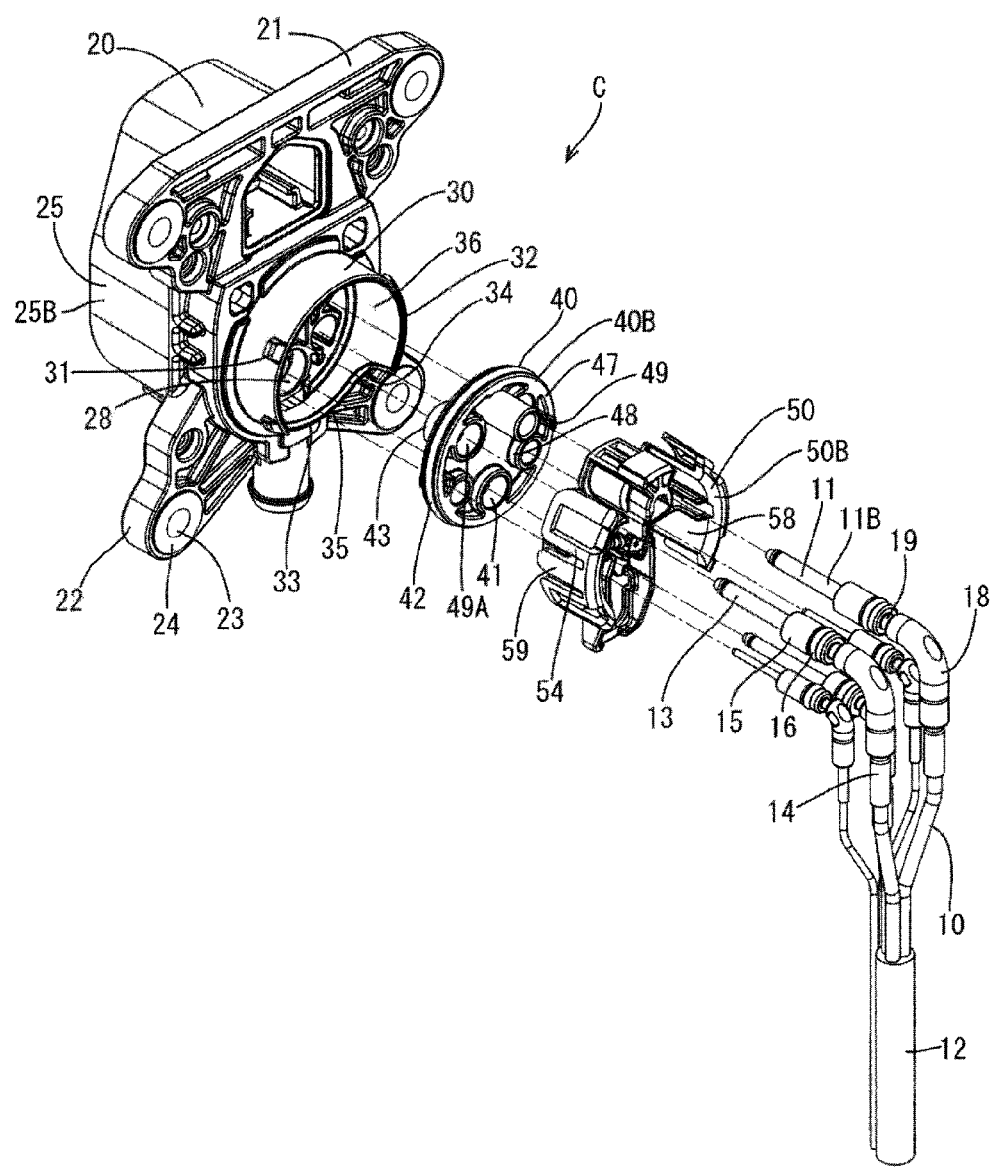
FIG. 10 is an exploded perspective view showing the vehicle-side connector when the wires are drawn out downward.

Two or more types of terminal fittings selectively used according to spatial restriction or the like are prepared as the vehicle-side terminal fittings 11. More particularly, the vehicle-side terminal fittings 11 include straight terminal fittings (hereinafter, referred to as first terminal fittings 11A) as shown in FIG. 2, and bent terminal fittings that are bent at an angle, preferably substantially at a right angle (hereinafter, referred to as second terminal fittings 11B) as shown in FIG. 10.

Every one of the first and second terminal fittings 11A, 11B includes a terminal connecting portion 13 to be connected to a charging terminal fitting provided in the charging connector and a wire connecting portion 14 to be connected to the end part of the wire 10. The wire connecting portion 14 has a tubular shape and is crimped to a core exposed by stripping the end of the wire 10 and inserted therein.

A terminal fitting portion 15 to be fit into an insertion hole 41 of an inner member 40 to be described later is provided between the terminal connecting portion 13 and the wire connecting portion 14. The terminal fitting portion 15 has a larger diameter than the terminal connecting portion 13 and the wire connecting portion 14 and a seal ring 16 is fit on the outer peripheral surface thereof.

The first terminal fitting 11A is a substantially straight round pin terminal. A flange 17 is provided on a side of the first terminal fitting 11A behind the terminal fitting portion 15 and has a larger diameter than the terminal fitting portion 15.

The second terminal fitting 11B is a round pin that is formed as an L-shaped or bent terminal by placing an unillustrated jig at a specified lengthwise position of a straight primarily molded terminal obtained by pressure-molding a metal round bar as a base material a plurality of times and bending the primarily molded terminal at an angle, preferably substantially at a right angle.

The second terminal fitting 11B is arranged so that the terminal connecting portion 13 and the wire connecting portion 14 are at an angle, preferably substantially perpendicular to each other and the terminal fitting portion 15 is coaxial with the terminal connecting portion 13. An insulating tube 18 made e.g. of synthetic resin is formed on a bent part of the second terminal fitting 11B by molding. One end surface of the insulating tube 18 is formed behind and at a predetermined distance from the rear end surface of the terminal fitting portion 15, and at least one locked groove 19 is formed between the one end surface of the insulating tube 18 and the rear end surface of the terminal fitting portion 15 into which a locking groove 57 of a second retainer 50B to be described later is fit to be locked.

The housing 20 is made e.g. of synthetic resin and includes, as shown in FIG. 1, a base plate 21 to be fixed to the vehicle. Mounting portions 22 project out at corners of the base plate 21 and a collar 24 made of a different material, such as metal and formed with a bolt hole 23, is provided in each mounting portion 22 by insert molding.

A connector fitting 25 is provided before the base plate 21 and the charging connector can fit therein.

Figure 8:
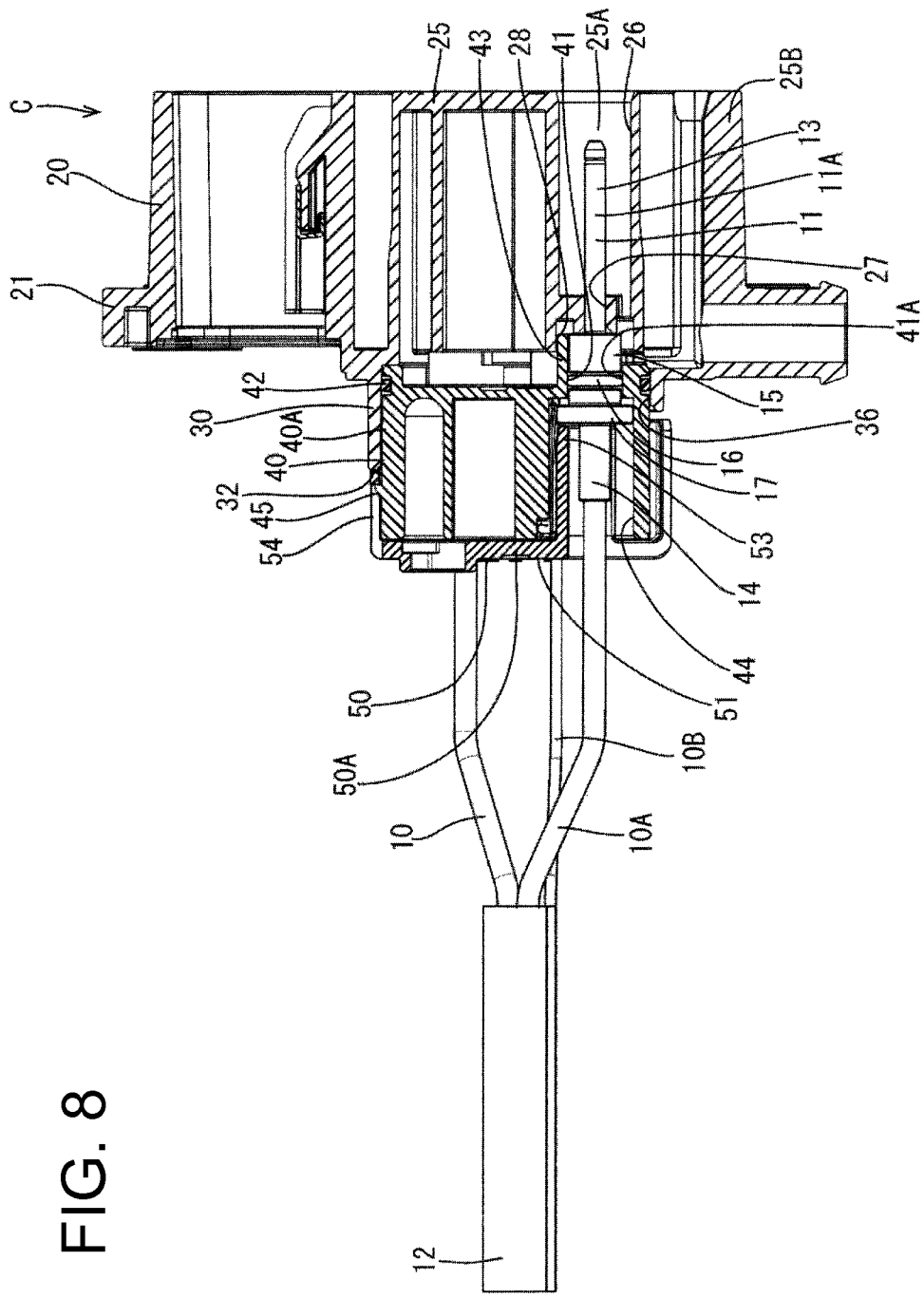
FIG. 8 is a section showing the vehicle-side connector when the wires are drawn out backward.
Figure 17:
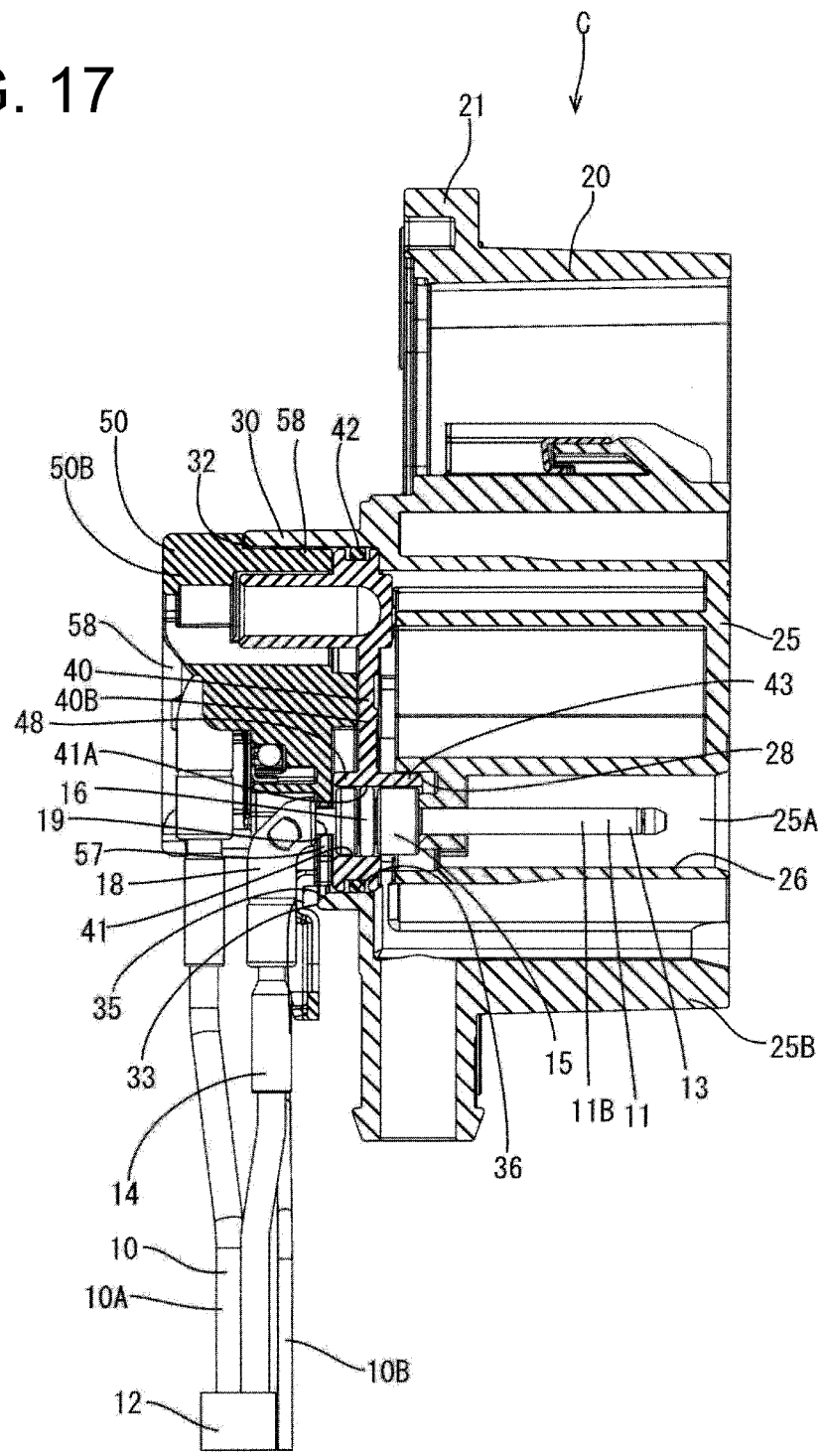
FIG. 17 is a section showing the vehicle-side connector when the wires are drawn out downward.

As shown in FIGS. 8 and 17, the connector fitting 25 includes a front terminal accommodating portion 25A into which the wire connecting portions 14 of the vehicle-side terminal fittings 11 are to be accommodated. The front terminal accommodating portion 25A has a substantially cylindrical shape and projects forward from the base plate 21. Front terminal accommodating chambers 26 are formed in the front terminal accommodating portion 25A and open forward and backward for accommodating the wire connecting portion 14 of the vehicle-side terminal fitting 11. Terminal accommodating tubes provided in the charging connector fit respectively into the front terminal accommodating chambers 26. Note that the two front terminal accommodating chambers 26 in an upper stage are for the power terminals P, the middle one in a lower stage is for the ground terminal G and those on opposite ends of the lower stage are for the signal terminals S.

The connector fitting 25 includes a large receptacle 25B at least partly surrounding an outer peripheral side of the front terminal accommodating portion 25A. A small receptacle of the charging connector can fit into a space between the front terminal accommodating portion 25A and the large receptacle 25B.

Figure 7:
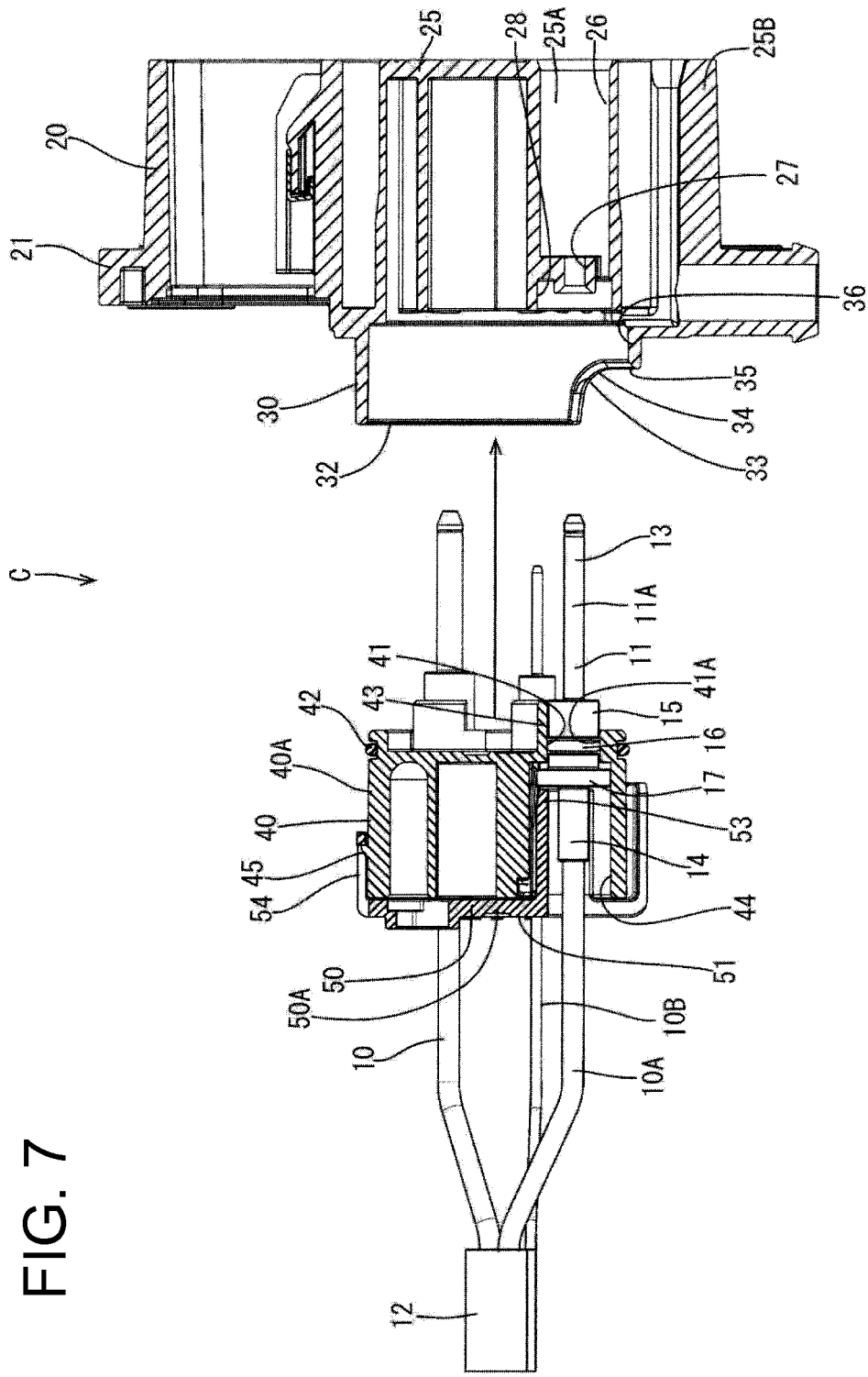
FIG. 7 is a section showing a state where the sub-assembled first inner member, first retainer and first terminal fittings are assembled into a housing.
Figure 16:
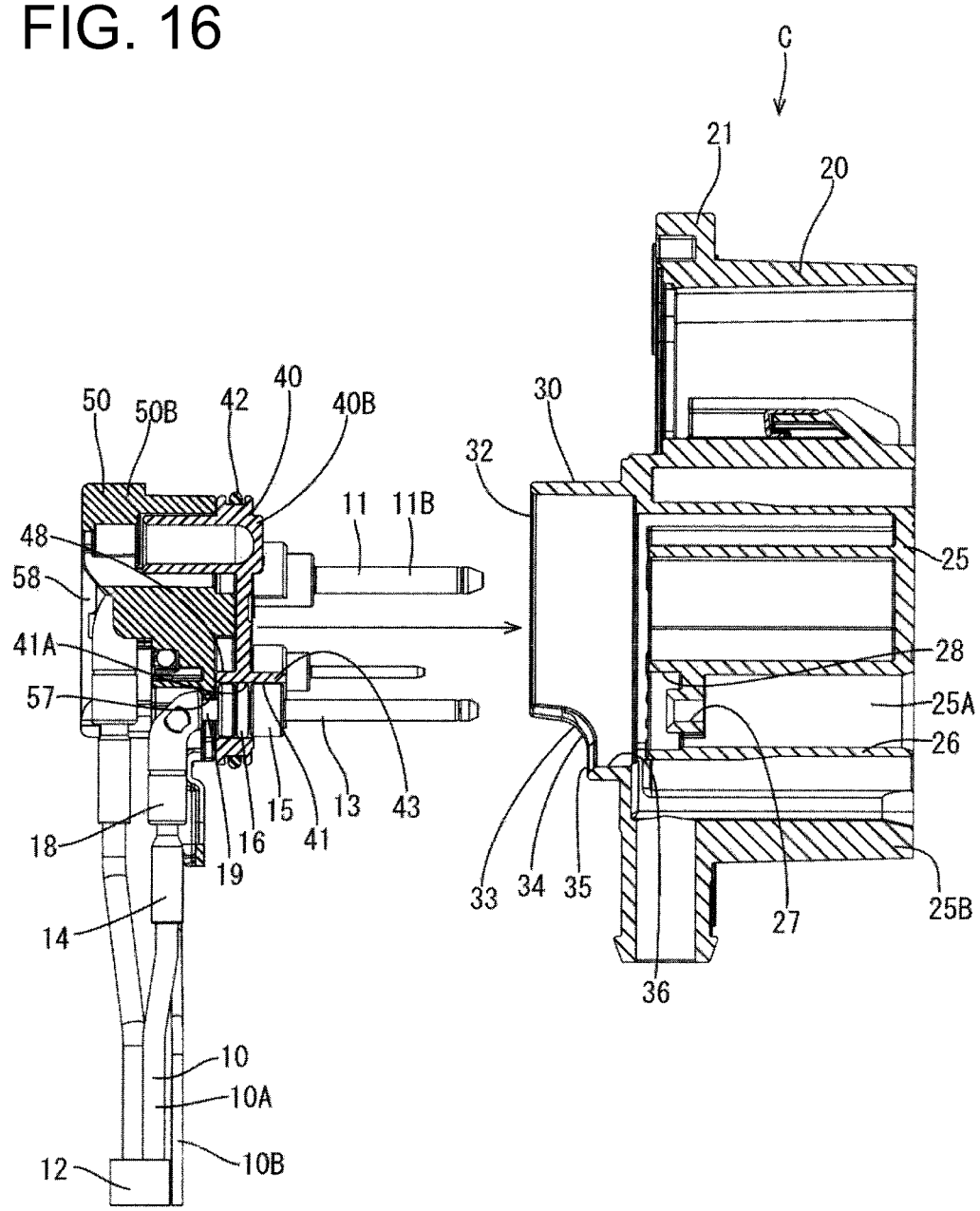
FIG. 16 is a section showing a state where the sub-assembled second inner member, second retainer and second terminal fittings are assembled into the housing.

As shown in FIGS. 7 and 16, a wall is provided near a rear end of each front terminal accommodating chamber 26, and has a through hole 27 for allowing the wire connecting portion 14 of the vehicle-side terminal fitting 11 to be inserted forward. The terminal fitting portion 15 of the vehicle-side terminal fitting 11 contacts the wall of the front terminal accommodating chamber 26 and the terminal connecting portion 13 is arranged into the front terminal accommodating chamber 26 through the through hole 27.

Further, a fitting recess 28 into which a fitting projection 43 of the inner member 40 to be described later is fittable is provided behind the wall of each front terminal accommodating chamber 26.

As shown in FIGS. 8 and 17, a rear terminal accommodating portion 30 is provided behind the base plate 21 capable of accommodating parts of the vehicle-side terminal fittings 11 behind the terminal connecting portions 13.

As shown in FIGS. 2 and 10, the rear terminal accommodating portion 30 has a cylindrical shape that projects substantially perpendicularly from the rear surface of the base plate 21 and is open backward. The rear terminal accommodating portion 30 is slightly larger than the front terminal accommodating portion 25A. Lock projections 31 are provided on the outer peripheral surface of the rear terminal accommodating portion 30. Specifically, two lock projections 31 are provided on each of opposite sides of the rear terminal accommodating portion 30. Lock frames 55 on a retainer 50 to be described later are locked to the respective lock projections 31. All the lock projections 31 are provided at the rear end of the rear terminal accommodating portion 30.

The rear terminal accommodating portion 30 includes a first draw-out opening 32 through which the wires 10 fixed to the vehicle-side terminal fittings 11 can be drawn out backward and a second draw-out opening 33 through which the wires 10 fixed to the vehicle-side terminal fittings 11 can be drawn out downward. An opening on the rear end of the rear terminal accommodating portion 30 defines the first draw-out opening 32.

Figure 9:
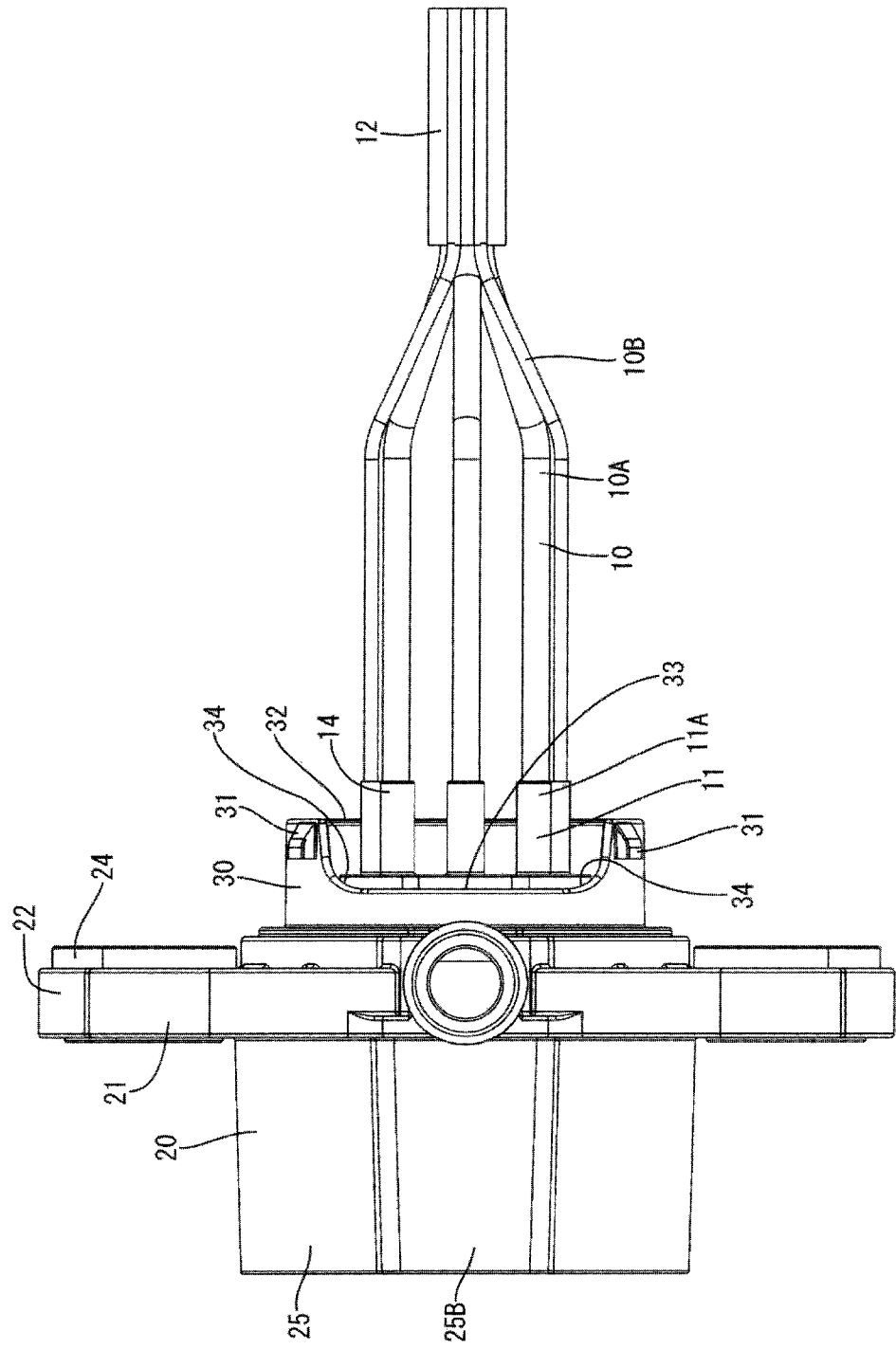
FIG. 9 is a bottom view of the vehicle-side connector with the first inner member and the first retainer removed when the wires are drawn out backward.
Figure 18:
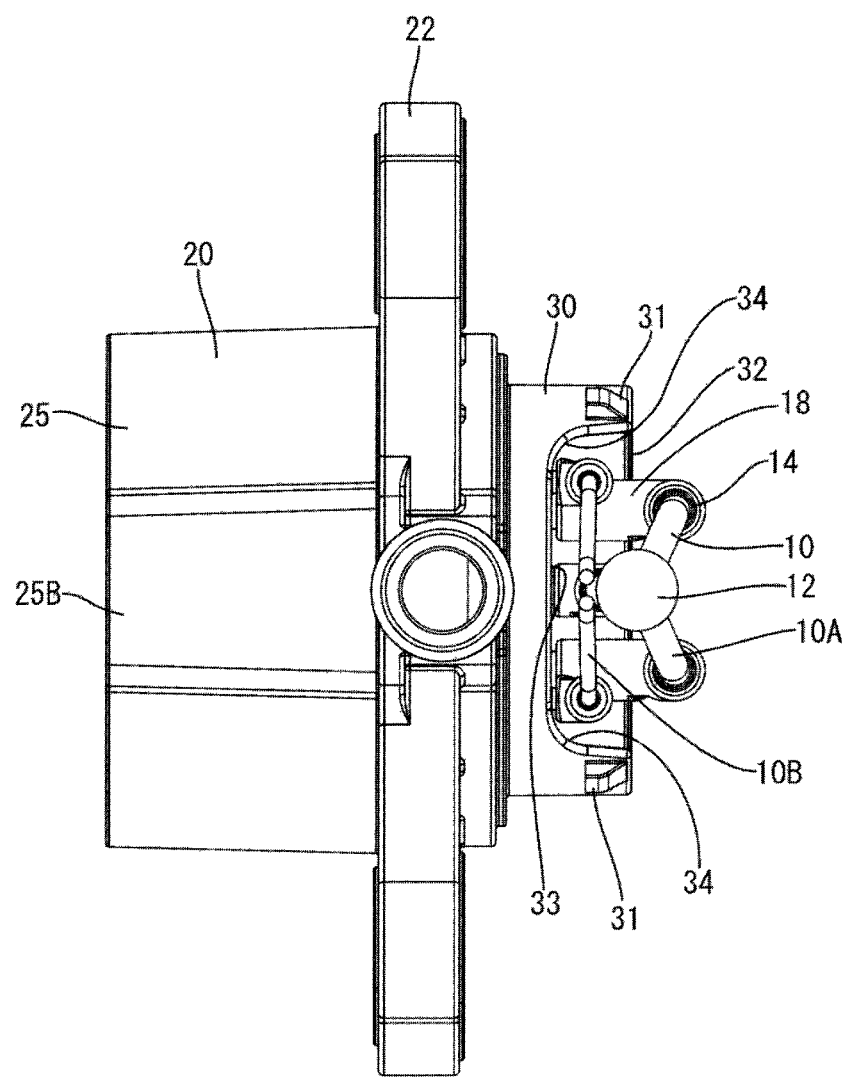
FIG. 18 is a bottom view of the vehicle-side connector with the second inner member and the second retainer removed when the wires are drawn out downward.

The second draw-out opening 33 is a cut formed on a rear end part of a peripheral wall of the rear terminal accommodating portion 30 to extend forward. The second draw-out opening 33 is provided on a lower side of the rear terminal accommodating portion 30 and formed entirely between a pair of lock projections 31 located on the lower side as shown in FIGS. 9 and 18. A dimension of the second draw-out opening 33 in a front-back direction is not shorter than substantially half the dimension of the rear terminal accommodating portion 30 in the front-back direction. Opposite corners of the front end of the second draw-out opening 33 are formed into arcuate rounded portions 34. Further, a chamfer 35 is formed on an inner side of the entire peripheral edge of the second draw-out opening 33.

As shown in FIGS. 8 and 17, a sealing surface 36 is provided on a part of the inner peripheral surface of the rear terminal accommodating portion 30 before the second draw-out opening 33 and can closely contact a seal ring 42 provided on the inner member 40 over the entire circumference.

The inner member 40 is fittable into the rear terminal accommodating portion 30 and is formed with the insertion holes 41 that enable the terminal connecting portions 13 of the vehicle-side terminal fittings 11 to be inserted into the connector fitting 25. The inner member 40 comprises a first inner member 40A having a larger dimension in the front-back direction than the rear terminal accommodating portion 30, as shown in FIG. 2, and a second inner member 40B having a smaller dimension in the front-back direction than the rear terminal accommodating portion 30, as shown in FIG. 10.

The seal ring 42 that can be held in close contact with the sealing surface 36 of the rear terminal accommodating portion 30 is fitted on the outer peripheral surface of each of the first and second inner members 40A, 40B.

The terminal fitting portions 15 of the first and second terminal fittings 11A, 11B can fit tightly into the insertion holes 41 of the first and second inner members 40A, 40B, as shown in FIGS. 7 and 16. Additionally, the inner peripheral surfaces of the insertion holes 41 define sealing surfaces 41A that closely contact seal rings 16 that fit on the respective terminal fitting portions 15 of the first and second terminal fittings 11A, 11B.

The insertion holes 41 are formed in the fitting projections 43 projecting on the front surfaces of the first and second inner members 40A, 40B. As shown in FIGS. 8 and 17, the front ends of the fitting projections 43 fit respectively into the fitting recesses 28 of the front terminal accommodating chambers 26. Note that lower sides of parts of the fitting projections 43 before the sealing surfaces 41A and the fitting recesses 28 are cut in a predetermined angle range.

As shown in FIG. 2, the inner member 40A is a cylinder with a radial dimension to fit into the rear terminal accommodating portion 30 and the seal ring 42 is fit on the outer peripheral surface near the front end.

As shown in FIG. 7, rear terminal accommodating chambers 44 are provided behind the insertion holes 41 of the first inner member 40A and are capable of accommodating the entire wire connecting portions 14 of the first terminal fittings 11A. As shown in FIG. 8, each rear terminal accommodating chamber 44 concentrically communicates with the front terminal accommodating chamber 26 when the first inner member 40A is fit into the rear terminal accommodating portion 30. Each rear terminal accommodating chamber 44 has an inner radial dimension so that the flange 17 of the first terminal fitting 11A is fittable therein.

Figure 5:
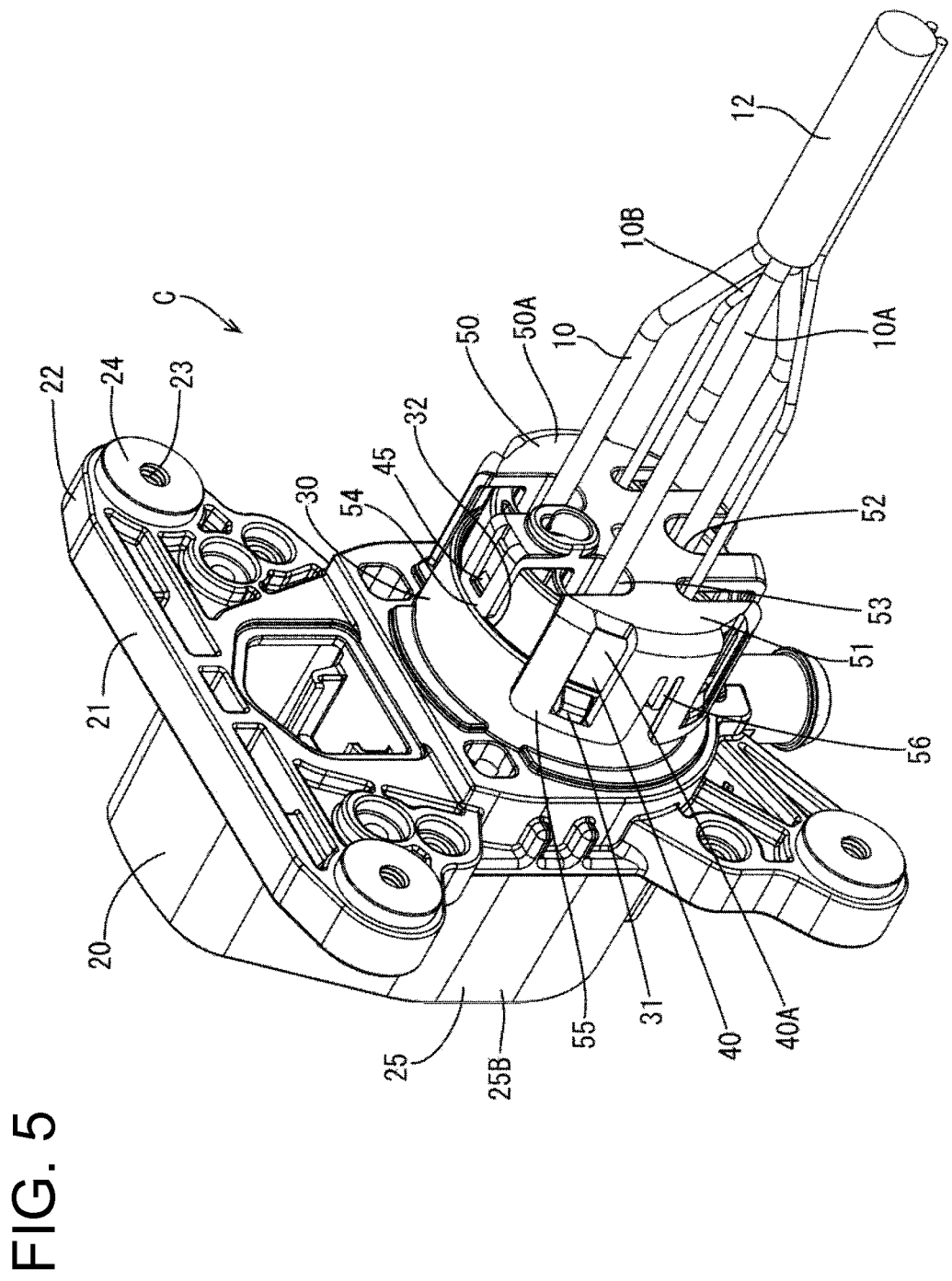
FIG. 5 is a perspective view showing the vehicle-side connector when the wires are drawn out backward.
Figure 6:
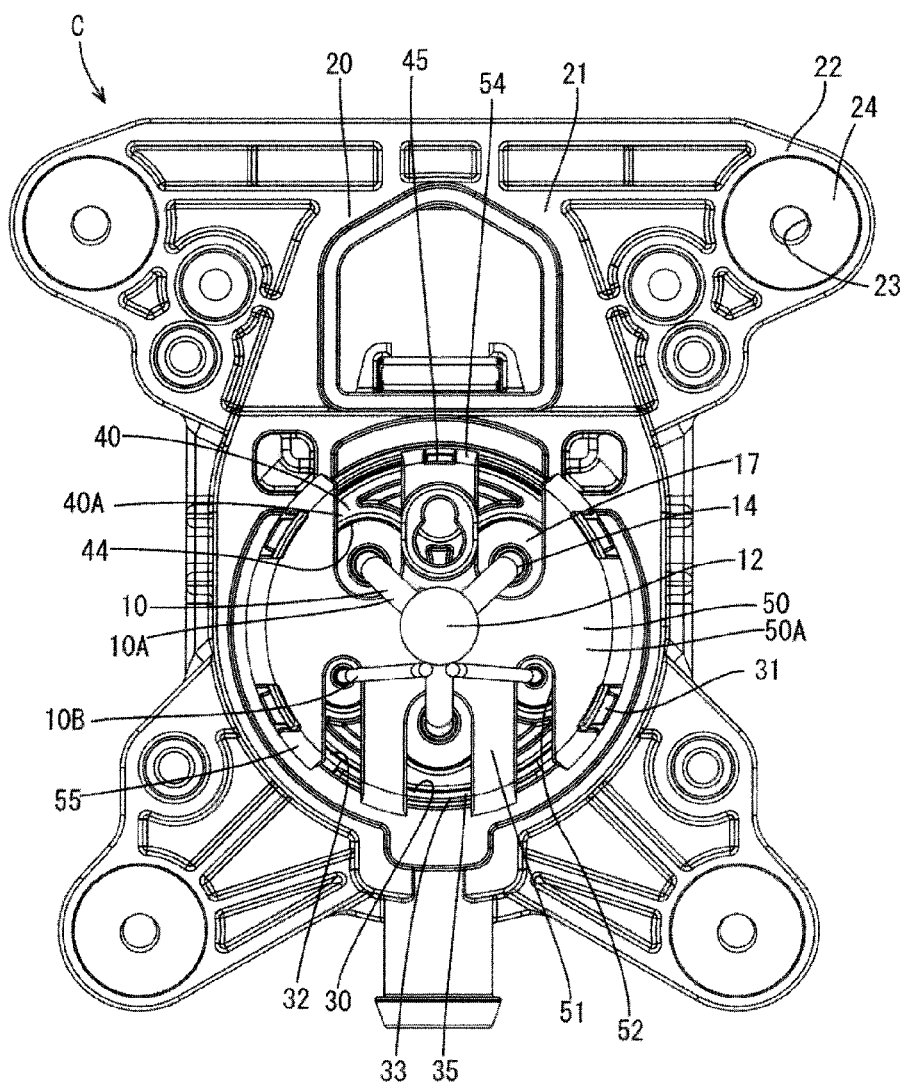
FIG. 6 is a rear view showing the vehicle-side connector when the wires are drawn out backward.

As shown in FIG. 2, a locking projection 45 is provided on the first inner member 40A and can lock with a lock piece 54 of a first retainer 50A to be described later can be locked. The locking projection 45 projects on the outer peripheral surface of the first inner member 40A and is provided on an upper side of the first inner member 40A at a substantially widthwise center. The locking projection 45 is at a predetermined distance from the rear end of the rear terminal accommodating portion 30 when the first inner member 40A is fit into the rear terminal accommodating portion 30 and a front end part of the lock piece 54 is fit with almost no clearance between the locking projection 45 and the rear end of the rear terminal accommodating portion 30, as shown in FIG. 5.

As shown in FIG. 2, the first inner member 40A is formed with long and narrow slits 46 extending forward from the rear end. Two of the slits 46 are provided on opposite sides of the first inner member 40A. The slits 46 have a length corresponding to a part of the first inner member 40A projecting back from the rear terminal accommodating portion 30.

As shown in FIG. 10, the second inner member 40B is in the form of a substantially thin circular plate that is substantially entirely fittable into a part of the rear terminal accommodating portion 30 before the second draw-out opening. The seal ring 42 is fit substantially in a center of the second inner member 40B in the front-back direction.

As shown in FIG. 10, an outer peripheral rib 47 is provided on the outer peripheral edge of the rear surface of the second inner member 40B over the entire circumference and inner peripheral ribs 48 are provided along the hole edges of the respective insertion holes 41.

Locking pieces 49 are provided on the rear surface of the second inner member 40B and can be locked to the second retainer 50B to be described later. Two of the locking pieces 49 are provided on opposite sides of the second inner member 40B and are cantilevered from the rear surface of the second retainer 50B. Claws 49A project radially out from the rear ends of the locking pieces 49 and lock to claws 61A of the second retainer 50B to be described later from an inner side.

Figure 4:
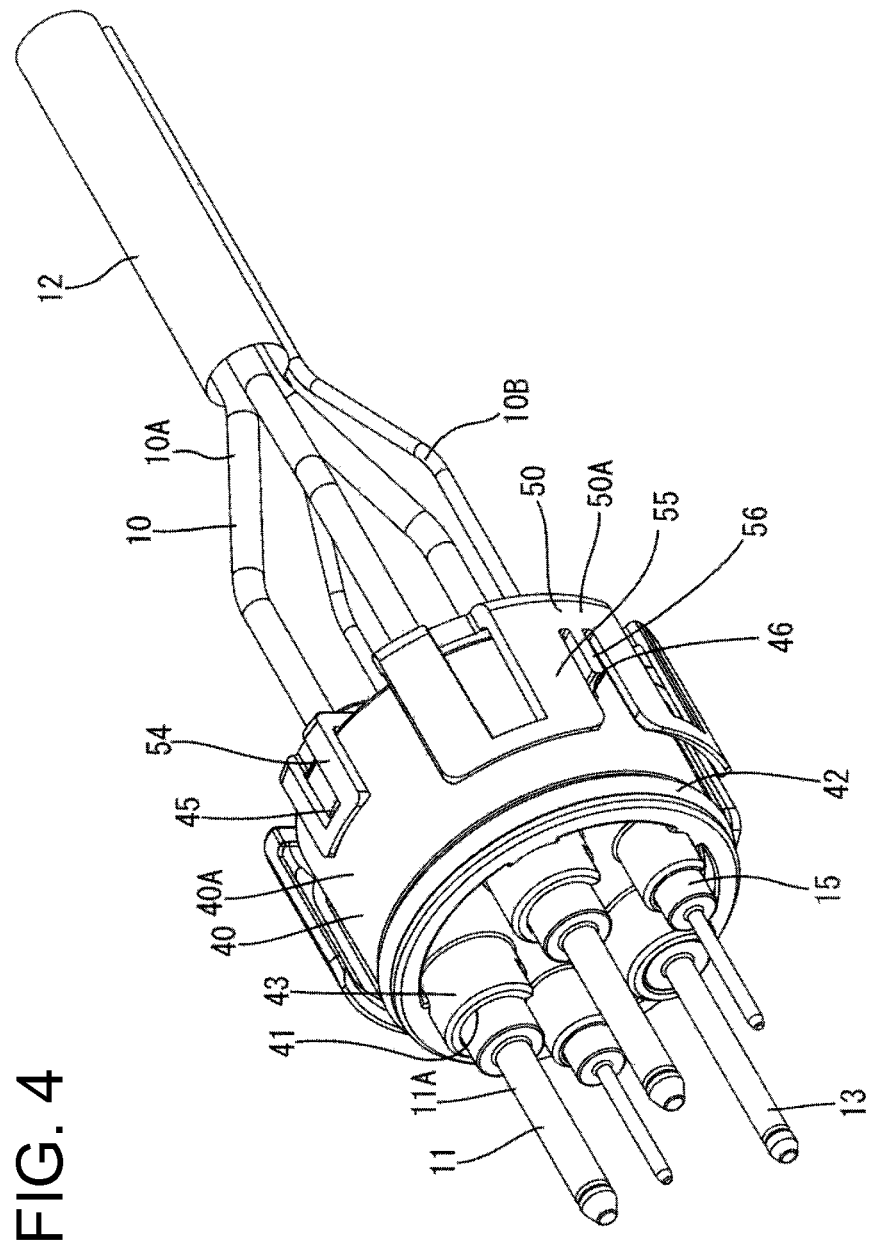
FIG. 4 is a perspective view showing a state where a first inner member, the first retainer and the first terminal fittings are sub-assembled.
Figure 13:
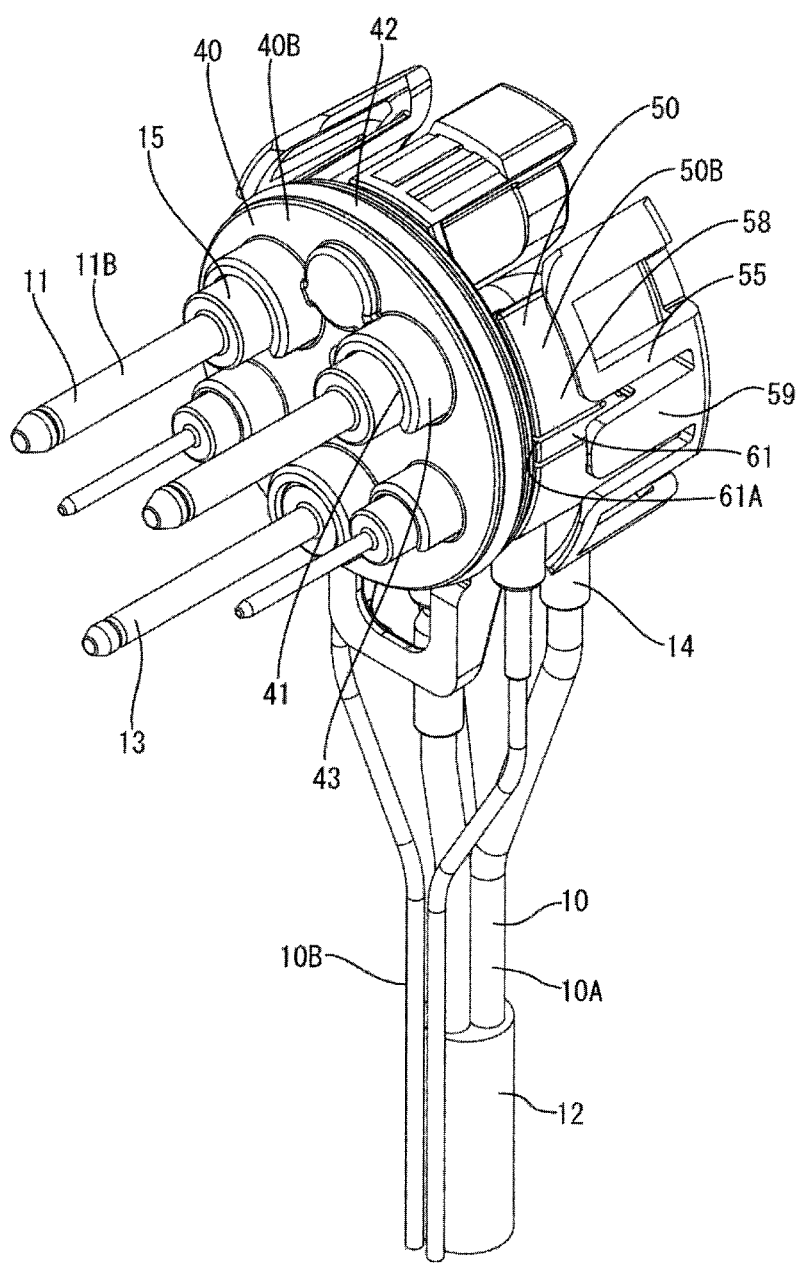
FIG. 13 is a perspective view showing a state where a second inner member, the second retainer and the second terminal fittings are sub-assembled.
Figure 14:
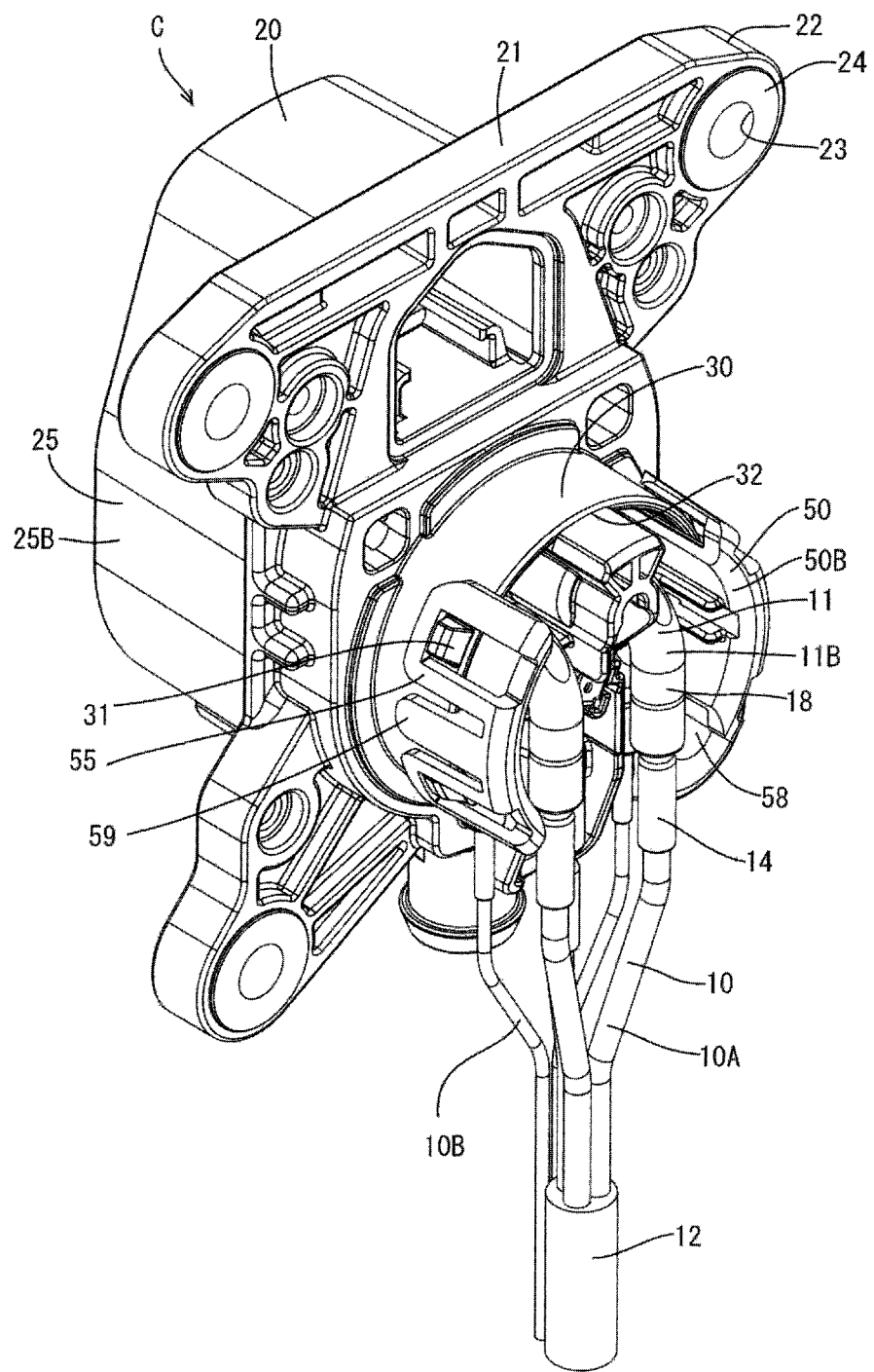
FIG. 14 is a perspective view showing the vehicle-side connector when the wires are drawn out downward.
Figure 15:
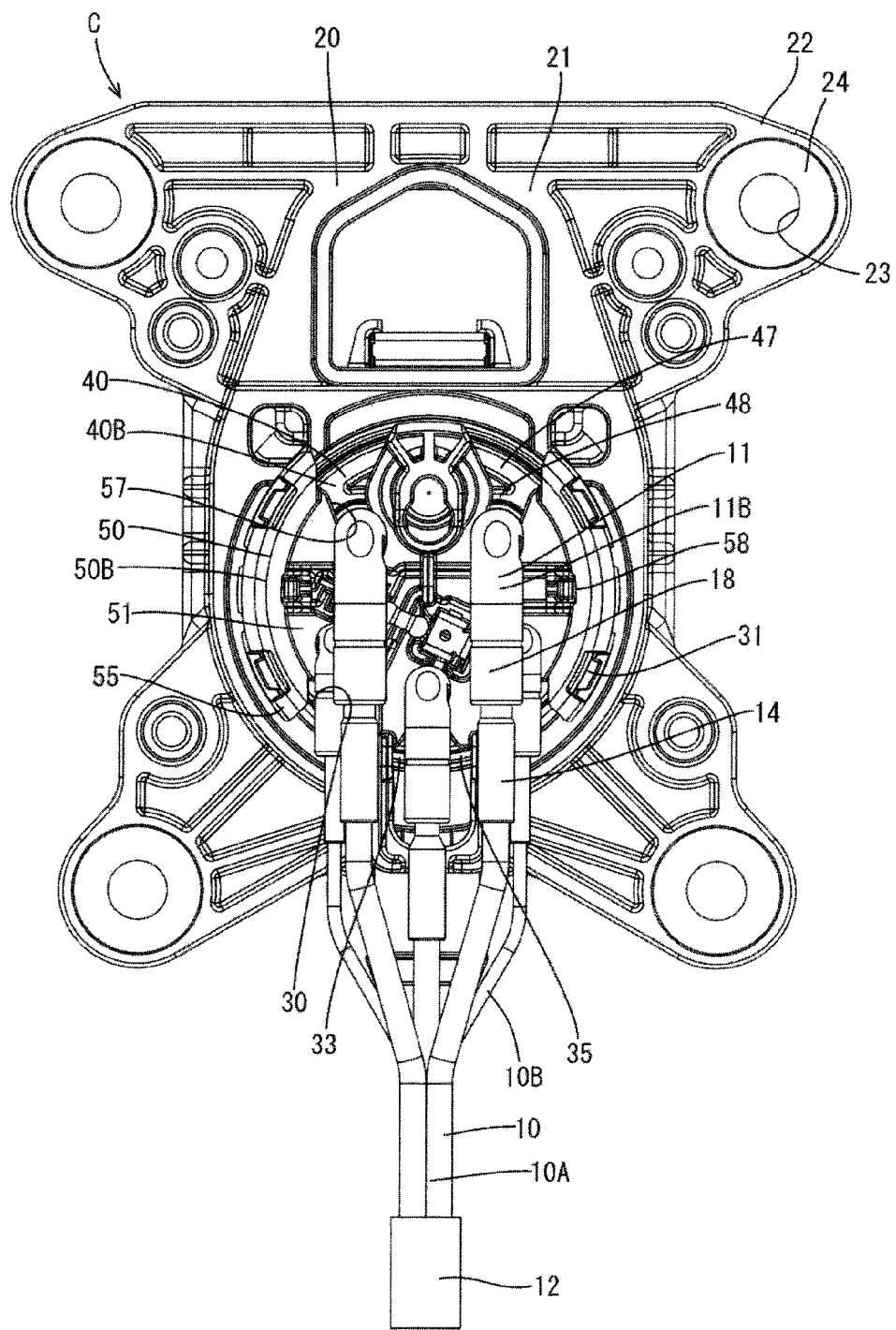
FIG. 15 is a rear view showing the vehicle-side connector when the wires are drawn out downward.

As shown in FIGS. 5 and 14, the vehicle-side connector C includes the retainer 50 to be assembled behind the housing 20. The retainer 50 is made of synthetic resin and is shaped to cover a rear end of the inner member 40. The retainer 50 includes a first retainer 50A that can be sub-assembled with the first inner member 40A, as shown in FIG. 4, and a second retainer 50B that can be sub-assembled with the second inner member 40B, as shown in FIG. 13.

As shown in FIG. 2, the first retainer 50A includes a disk-shaped main body plate 51 to be brought into contact with the rear surface of the first inner member 40A. The main body plate 51 is formed with five grooves 52 that can receive the wires 10 fixed to the first terminal fittings 11A from a radially outer side. Each groove 52 is formed by cutting the main body plate 51 to open toward the radially outer side. A back end edge of the groove 52 is semicircular.

Figure 3:
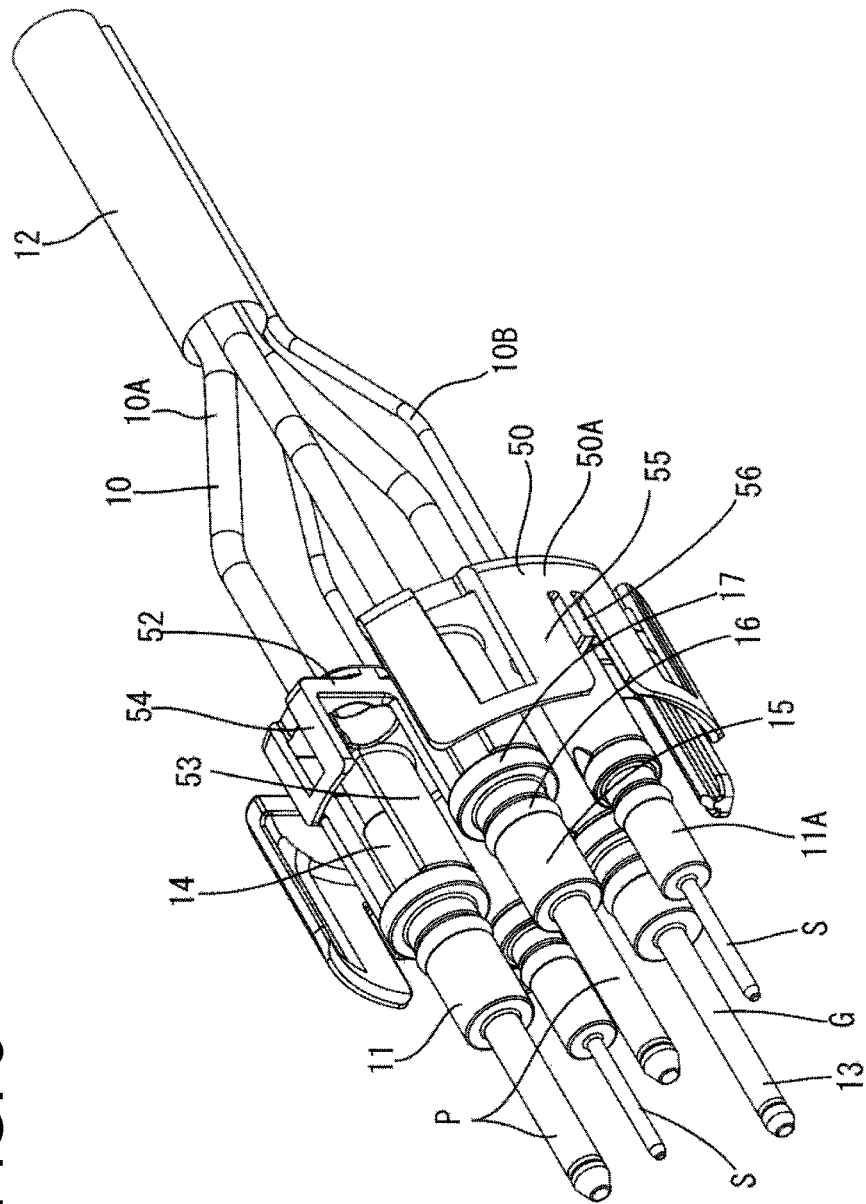
FIG. 3 is a perspective view showing a state where a first retainer and first terminal fittings are assembled.

As shown in FIG. 3, locking bodies 53 are provided on the front surface of the main body plate 51. The locking bodies 53 have a substantially circular cross-section and project forward from the back end edge of the groove portion 52. The front end of the locking body 53 is located behind the flange 17 of the first terminal fitting 11A to prevent the first terminal fitting 11A from coming out backward. As shown in FIG. 7, the locking body 53 can fit into the rear terminal accommodating chamber 44 of the first inner member 40A to extend along the inner peripheral surface of the rear terminal accommodating chamber 44.

As shown in FIG. 5, the lock piece 54 projects forward from the peripheral edge of the main body plate 51 and is lockable to the locking projection 45 of the first inner member 40A.

As shown in FIG. 5, the lock frames 55 project forward from the peripheral edge of the main body plate 51 and are lockable to the lock projections 31 of the rear terminal accommodating portion 30. Two of the lock frames 55 are provided on each of opposite widthwise sides of the retainer 50 and are resiliently deformable inward and outward. Parts of the lock frames 55 extending in the front-back direction have a larger width (dimension in a circumferential direction) than the corresponding part of the lock piece 54. Further, front end parts (laterally extending parts) of the lock frames 55 have an equal width to the corresponding part of the lock piece 54.

An inserting portion 56 to be inserted into the slit 46 of the first inner member 40A and arranged proximate to the rear end edge of the rear terminal accommodating portion 30 of the housing 20 is provided to.

Figure 11:
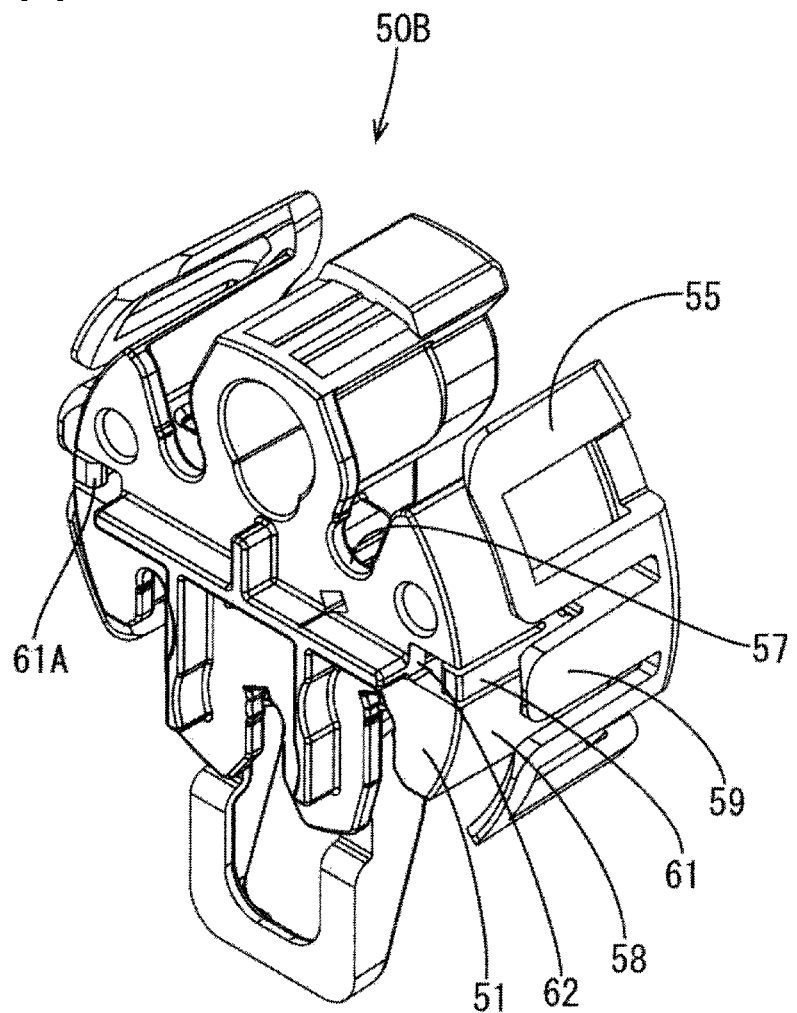
FIG. 11 is a perspective view showing a second retainer.

As shown in FIG. 11, the second retainer 50B includes a disk-shaped main body plate 51 to be brought into contact with the rear surface of the inner member 40 and fittable into the rear terminal accommodating portion 30.

Figure 12:
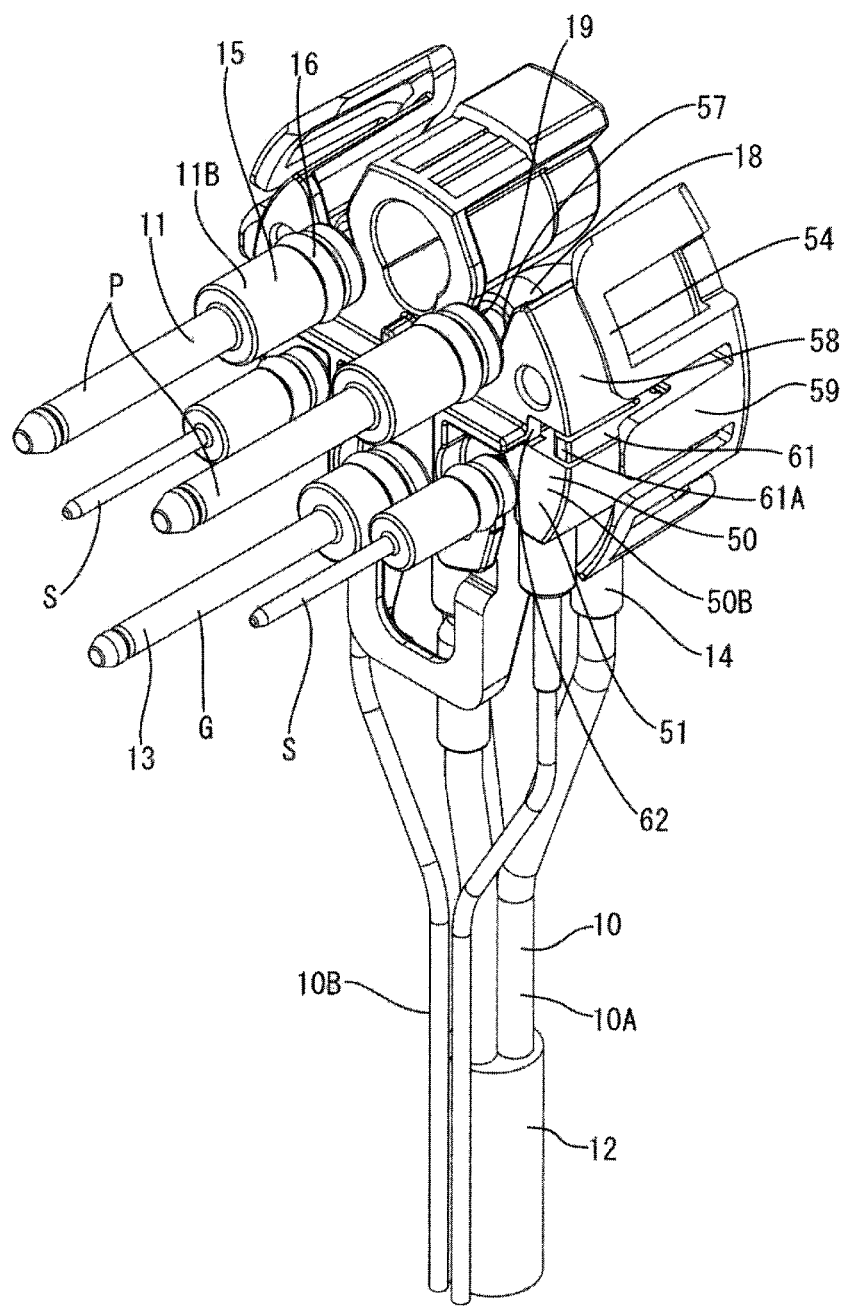
FIG. 12 is a perspective view showing an assembled state of the second retainer and second terminal fittings.

As shown in FIGS. 11 and 12, the main body plate 51 is formed with five locking grooves 57 into which the locked grooves 19 formed on the second terminal fittings 11B are insertable from a radially outer side and which are lockable to the locked grooves 19. The locking grooves 57 are respectively formed by cutting the main body plate 51 to be open toward the radially outer side. A part of the locking groove 57 located on a central side of the main body plate 51 is made narrower than a part thereof located on an outer peripheral side so as to be tightly fittable to the locked groove 19.

As shown in FIG. 11, a peripheral wall 58 having a cylindrical tubular shape and projecting backward is provided on the outer peripheral edge of the main body plate 51. The peripheral wall 58 is provided on left, right and upper sides of the outer peripheral edge of the main body plate 51 except opening parts of the locking grooves 57. As shown in FIG. 17, the peripheral wall 58 is arranged to extend along the inner peripheral surface of the rear terminal accommodating portion 30 and a rear part thereof projects back from the rear terminal accommodating portion 30.

Two lock frames 55 lockable to the lock projections 31 provided on the outer peripheral surface of the rear terminal accommodating portion 30 are provided on each of left and right sides of the outer periphery of the second retainer 50B. The lock frames 55 are resiliently displaceable inwardly and outwardly while being folded back to extend forward from the rear end edge of the peripheral wall plate 58.

A clamping plate 59 capable of clamping the rear terminal accommodating portion 30 between the clamping plate 59 and the peripheral wall 58 is formed between a pair of lock frames 55 on each of opposite sides of the second retainer 50B while being similarly folded back to extend forward from the rear edge of the peripheral wall plate 58.

Further, locking pieces 61 lockable to the locking pieces 49 of the second inner member 40B in the front-back direction are provided on the peripheral wall 58 of the second retainer 50B. The locking pieces 61 are arranged at positions facing the clamping plates 59. Insertion openings 62 into which the locking pieces 49 of the second inner member 40B are to be inserted are provided to be open at inner sides of the locking pieces 61. The locking claws 61A are formed on parts of the locking pieces 61 facing the insertion openings 62.

Next, an example of a procedure of assembling the vehicle-side connector C described above and mounting it on a body are described.

First, the housing 20 is fixed to the body in advance. The mounting portion(s) 22 provided on the base plate portion 21 of the housing 20 is/are so placed on mounted portion(s) provided on an opening edge part of a power supply port open on the body that the connector fitting portion 25 of the housing 20 is located in the power supply port, and fixed particularly by one or more tightening bolts.

Subsequently, the inner member 40, the vehicle-side terminal fittings 11 and the retainer 50 are assembled into the housing 20. At this time, if it is desired to draw out the wires 10 directly backward from the vehicle-side connector C due to the layout of parts in an engine compartment, the first terminal fittings 11A are used as the vehicle-side terminal fittings 11 to be fixed to the ends of the wires 10 and the first inner member 40A and the first retainer 50A are assembled into the housing 20.

Further, if it is desired to draw out the wires 10 downward from the vehicle-side connector C, the second terminal fittings 11B are used as the vehicle-side terminal fittings 11 to be fixed to the ends of the wires 10 and the second inner member 40B and the second retainer 50B are assembled into the housing 20.

First, a case where the wires 10 are drawn out directly backward from the vehicle-side connector C is described.

Initially, first terminal fittings 11A connected to the ends of the wires 10 are temporarily assembled with the first retainer 50A as shown in FIG. 3. The wires 10 fixed to the first terminal fittings 10A are respectively inserted to the back ends of the corresponding groove portions 52 of the first retainer 50A and the flange portions 17 of the respective first terminal fittings 11A are placed on the tips of the locking bodies 53 (temporarily assembled state) by pulling the wires 10 backward.

Subsequently, the temporarily assembled first retainer 50A and first terminal fittings 11A are mounted into the first inner member 40A to subassemble these as shown in FIG. 4. The terminal connecting portion 13 of each first terminal fitting 11A is inserted into the corresponding rear terminal accommodating chamber 44 of the first inner member 40A from behind and the locking body 53 is fitted together with the flange portion 17 into the rear terminal accommodating chamber 44 (see FIG. 7). Then, the terminal fitting portion 15 of the first terminal fitting 11A is fitted into the insertion hole 41 of the first retainer 50A and the seal ring 42 16 fitted on the terminal fitting portion 15 comes into close contact with the sealing surface 41A of the insertion hole 41.

Then, the inserting portions 56 of the first retainer 50A are inserted into the slits 46 of the first inner member 40A and the locking piece 54 of the first retainer 50A is locked to the locking projection 45 of the first inner member 40A, whereby the first inner member 40A and the first retainer 50A are held in an assembled state. In this way, the first retainer 50A, the first inner member 40A and the first terminal fittings 11A are integrally sub-assembled. Note that, in the sub-assembled state, the terminal connecting portions 13 of the first terminal fittings 11A are aligned and project forward from the front surface of the first inner member 40A.

Subsequently, the subassembled first retainer 50A, first inner member 40A and first terminal fittings 11A are assembled into the housing 20 as shown in FIGS. 7 and 8. The subassembled first retainer 50A, first inner member 40A and first terminal fittings 11A are fitted into the rear terminal accommodating portion 30 from behind while the terminal connecting portions 13 of the first terminal fittings 11A are inserted into the front terminal accommodating chambers 26 of the housing 20 through the through holes 27. Then, the terminal connecting portion 13 of each first terminal fitting 11A is arranged in the front terminal accommodating chamber 26 through the corresponding through hole 27 and the fitting projections 43 of the first inner member 40A are fitted into the fitting recesses 28 of the housing 20. Further, the seal ring 42 of the first retainer 50A first inner member 40A is held in close contact with the sealing surface 36 of the rear terminal accommodating portion 30 and the lock frames 55 of the first retainer 50A are resiliently deformed. After moving over the lock projections 31 of the rear terminal accommodating portion 30, the lock frames 55 are resiliently restored to be locked to the lock projections 31. In this way, the sub-assembled first retainer 50A, first inner member 40A and first terminal fittings 11A are integrally assembled and held in the housing 20.

In this way, the wires 10 are drawn out directly backward from the vehicle-side connector C and the assembling of the vehicle-side connector C and the mounting thereof on the body are completed by mounting unillustrated grommets on the wires 10 and mounting an unillustrated front cover on the front surface of the housing 20.

Next, a case where the wires 10 are drawn out in a second direction at an angle, preferably substantially perpendicular to the first direction, particularly laterally or radially (e.g. down) from the vehicle-side connector C is described.

Initially, the second terminal fittings 11B connected to the ends of the wires 10 are temporarily assembled with the second retainer 50B as shown in FIG. 12. The locked grooves 19 of the second terminal fittings 11B are respectively inserted into the corresponding locking groove portions 57 of the second retainer 50B until reaching the back ends of the locking groove portions 57. In this way, the locked grooves 19 and side edges of the locking groove portions 57 are locked in the front-back direction and the second terminal fittings 11B are temporarily assembled with the second retainer 50B. At this time, out of the five second terminal fittings 11B, substantially vertical or radial parts (downwardly bent parts of the insulating tube portions 18 and the wire connecting portions 14) of the two power terminals P arranged in the upper stage are arranged slightly behind the corresponding parts of the pair of signal terminals S and the ground terminal G arranged in the lower stage (see FIG. 16). Note that the vertical parts of all the second terminal fittings 11B are accommodated inside the peripheral wall plate 58 of the second retainer 50B without projecting backward.

Subsequently, the temporarily assembled second retainer 50B and second terminal fittings 11B are mounted into the second inner member 40B to subassemble these as shown in FIG. 13. The second inner member 40B is assembled by inserting the terminal connecting portion 13 of each second terminal fitting 11B into the corresponding rear terminal accommodating chamber 44 of the second inner member 40B from behind. When side edge parts of the locking groove portions 57 of the second retainer 50B are pushed until coming into contact with the inner peripheral ribs 48, the terminal fitting portions 15 of the second terminal fittings 11B are fitted into the insertion holes 41 of the second inner member 40B and the seal rings 16 fitted on the terminal fitting portions 15 are held in close contact with the sealing surfaces 41A of the insertion holes 41. Further, the locking pieces 49 of the second inner member 40B are inserted into inner sides of the locking pieces 61 of the second retainer 50B and the locking pieces 49, 61 are resiliently restored to lock to each other after moving over the mating claw portions 61A, 49A while being resiliently deformed, whereby the second inner member 40B and the second retainer 50B are held in an assembled state. In this way, the second retainer 50B, the second inner member 40B and the second terminal fittings 11B are integrally subassembled. Note that, in the subassembled state, the terminal connecting portions 13 of the second terminal fittings 11B are aligned and project forward from the front surface of the second inner member 40B as shown in FIG. 13.

Subsequently, the subassembled second retainer 50B, second inner member 40B and second terminal fittings 11B are assembled into the housing 20 as shown in FIGS. 16 and 17. The subassembled second retainer 50B, second inner member 40B and second terminal fittings 11B are fitted into the rear terminal accommodating portion 30 from behind while the terminal connecting portions 13 of the second terminal fittings 11B are inserted into the front terminal accommodating chambers 26 of the housing 20 through the through holes 27. Then, the terminal connecting portion 13 of each second terminal fitting 11B is arranged in the front terminal accommodating chamber 26 through the corresponding through hole 27 and the fitting projections 43 of the second inner member 40B are fitted into the fitting recesses 28 of the housing 20. Further, the second inner member 40B is fitted into the front end of the rear terminal accommodating portion 30, the seal ring 42 of the second inner member 40B is held in close contact with the sealing surface 36 of the rear terminal accommodating portion 30 and the lock frames 55 of the second retainer 50B are resiliently deformed. After moving over the lock projections 31 of the rear terminal accommodating portion 30, the lock frames 55 are resiliently restored to be locked to the lock projections 31. In this way, the sub-assembled second retainer 50B, second inner member 40B and second terminal fittings 11B are integrally assembled and held in the housing 20.

At this time, the vertical parts of the signal terminals S and the ground terminal G project radially or laterally (e.g. down) through the second draw-out opening 33 of the housing 20, and other terminals (e.g. the pair of power terminals P) project radially or laterally (e.g. down) from the housing 20 at positions slightly behind the above vertical parts. Note that, in the assembled state, a dimension of a rear part of the vehicle-side connector C in the front-back direction (part behind the base plate portion 21 and including the second retainer 50B) is shorter than that of a front part (connector fitting portion 25) in the front-back direction.

In this way, the wires 10 are drawn out directly radially or laterally (e.g. down) from the vehicle-side connector C and the assembling of the vehicle-side connector C and the mounting thereof on the body are completed by mounting the unillustrated grommets on the wires 10 and mounting the unillustrated front cover on the front surface of the housing 20. According to this embodiment configured as described above, the following effects are achieved.

The connector of this embodiment is the vehicle-side connector C to which the charging connector is to be connected at the time of charging and includes the housing 20 that is capable of accommodating the vehicle-side terminal fittings 11 fixed to the end parts of the wires 10 drawn out from the battery or the like in the vehicle, the connector fitting portion 25 that is provided in a front part of the housing 20, into which the charging connector is fittable and in which the terminal connecting portions 13 of the vehicle-side terminal fittings 11 electrically connectable to the charging connector are arranged, and the rear terminal accommodating portion 30 which is provided in a rear part of the housing 20 and capable of accommodating parts of the vehicle-side terminal fittings 11 behind the terminal connecting portions 13 and includes the first draw-out opening 32 through which the wires 10 can be drawn out backward and the second draw-out opening 33 through which the wires 10 can be drawn out laterally or radially (e.g. down).

Accordingly, the wires 10 can be selectively drawn out from the housing 20 in two different directions being arranged at an angle, preferably substantially perpendicular to each other. This enables the wires to be drawn out through the first draw-out opening 32 when it is desired to draw out the wires 10 axially or back from the vehicle-side connector C and to be drawn out through the second draw-out opening 33 when it is desired to draw out the wires 10 radially or laterally (e.g. down) from the vehicle-side connector C particularly due to spatial restriction or the like. By drawing out the wire(s) 10 substantially laterally or radially (e.g. down) through the second draw-out opening 33, a backward projecting distance can be reduced as compared with the case where the wires 10 drawn out through the first draw-out opening 32 are bent at an angle. Thus, the housing 20 can be used commonly regardless of spatial restriction and the like. Further, the vehicle-side terminal fittings 11 are the second terminal fitting(s) 11B which are bent at an angle, preferably substantially at a right angle and parts of which can project laterally or radially (e.g. down) through the second draw-out opening 33.

Since this can reduce a bending radius as compared with the case where the wires 10 are bent, the backward projecting distance can be reduced further.

Further, the rear terminal accommodating portion 30 has a tubular shape which is open backward, the inner member 40 formed with the insertion holes 41 enabling the terminal connecting portions 13 of the vehicle-side terminal fittings 11 to be inserted into the connector fitting portion 25 is fittable into the rear terminal accommodating portion 30 and the inner member 40 is the second inner member 40B in the form of a thin plate fittable into a side of the rear terminal accommodating portion 30 before the second draw-out opening 33. Since this enables straight parts of the second terminal fittings 11B arranged in the insertion holes 41 of the second inner member 40B to be shorted as compared with the case where the inner member is in the form of a thick plate, the backward projecting distance can be further reduced.

The invention is not limited to the above described embodiment. For example, the following embodiments also are included in the scope of the invention.

Although the present invention is applied to the vehicle-side connector C provided in the plug-in hybrid vehicle in the above embodiment, there is no limitation to this. The present invention can be similarly applied also to a vehicle-side connector provided in an electric vehicle.

Although the sub-assembled retainer 50, inner member 40 and vehicle-side terminal fittings 11 are assembled into the housing 20 after the housing 20 is fixed to the body in advance in the example of the procedure of assembling the vehicle-side connector C and mounting it on the body in the above embodiment, there is no limitation to this. For example, the sub-assembled retainer 50, inner member 40 and vehicle-side terminal fittings 11 may be assembled into the housing 20 before the housing 20 is fixed to the body and the housing 20 completely assembled with those may be fixed to the body.

Although the sub-assembled retainer 50, inner member 40 and vehicle-side terminal fittings 11 are assembled into the housing 20 as the example of the procedure of assembling the vehicle-side connector C in the above embodiment, it is not always necessary to sub-assemble these in advance. After the inner member 40 is assembled into the housing 20, the vehicle-side terminal fitting(s) 11 and the retainer 50 may be assembled into the housing 20.

Although the bent second terminal fittings 11B are used when it is desired to draw out the wires 10 laterally or radially (e.g. down) from the vehicle-side connector C in the above embodiment, there is no limitation to this and straight terminal fittings may be used and the wires may be bent.

Although the second draw-out opening 33 provided on the rear terminal accommodating portion 30 enables the wires 10 to be drawn out down in the above embodiment, there is no limitation to this and the second draw-out opening may enable wires to be drawn out upward, leftward or rightward or in any direction (e.g. radial direction) except a backward direction (axial direction).

Although the second terminal fittings 11B partly project downwardly through the second draw-out opening 33 in the above embodiment, there is no limitation to this and the second terminal fittings may be entirely accommodated in the rear terminal accommodating portion and only the wires may be drawn out laterally or radially (e.g. down) through the second draw-out opening.

Although the rear terminal accommodating portion 30 has a tubular shape which is open backward and the inner member 40 is fitted into the rear terminal accommodating portion 30 in the above embodiment, the rear terminal accommodating portion needs not necessarily be formed into such a shape. For example, the rear terminal accommodating portion may be provided with an additional configuration capable of holding the vehicle-side terminal fittings and the retainer may be only mounted.

REFERENCE SIGNS

C . . . vehicle-side connector
10 . . . wire
11 . . . vehicle-side terminal fitting
11B . . . second terminal fitting (bent terminal fitting)
13 . . . terminal connecting portion
20 . . . housing
25 . . . connector fitting portion
30 . . . rear terminal accommodating portion (terminal accommodating portion)
32 . . . first draw-out opening
33 . . . second draw-out opening
40 . . . inner member
40B . . . second inner member (thin inner member)
41 . . . insertion hole

What is claimed is:

1. A vehicle-side connector to which a charging connector is to be connected, comprising:
   a housing capable of accommodating a vehicle-side terminal fitting fixed to a wire drawn out from a battery in a vehicle;
   a connector fitting provided in a front part of the housing into which the charging connector is fittable and in which a terminal connecting portion of the vehicle-side terminal fitting that is electrically connectable to the charging connector is arranged; and
   a terminal accommodating portion provided in a rear part of the housing, capable of accommodating a part of the vehicle-side terminal fitting behind the terminal connecting portion and formed with a first draw-out opening through which the wire can be drawn in a first direction and a second draw-out opening through which the wire can be drawn out in a second direction at an angle to the first direction.

2. The vehicle-side connector of claim 1, wherein the vehicle-side terminal fitting includes a bent terminal fitting that is bent at an angle and partly projects laterally through the second draw-out opening.

3. The vehicle-side connector according to any one of the preceding claim 1, wherein the terminal accommodating portion has a tubular shape that is open backward.

4. The vehicle-side connector of claim 1, further comprising an inner member fit into the terminal accommodating portion and formed with an insertion hole enabling the terminal connecting portion of the vehicle-side terminal fitting to be inserted into the connector fitting.

5. The vehicle-side connector of claim 4, wherein the inner member includes a thin inner member substantially in the form of a thin plate fittable into a side of the terminal accommodating portion before the second draw-out opening.

* * * * *